(12) United States Patent  
Durant et al.

(10) Patent No.: US 8,904,068 B2  
(45) Date of Patent: Dec. 2, 2014

(54) VIRTUAL MEMORY STRUCTURE FOR COPROCESSORS HAVING MEMORY ALLOCATION LIMITATIONS

(75) Inventors: Luke Durant, Santa Clara, CA (US); Ze Long, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 388 days.

(21) Appl. No.: 13/467,611

(22) Filed: May 9, 2012

(65) Prior Publication Data

US 2013/0305009 A1    Nov. 14, 2013

(51) Int. Cl.
*G06F 3/00* (2006.01)
*G06F 13/00* (2006.01)

(52) U.S. Cl.
USPC .............................................. 710/56; 710/57

(58) Field of Classification Search
CPC ........ G06F 3/00; G06F 2003/00; G06F 13/00
USPC ....................... 710/73; 715/700, 762; 345/173
See application file for complete search history.

(56) References Cited

U.S. PATENT DOCUMENTS

| | | | |
|---|---|---|---|
| 6,327,639 B1 * | 12/2001 | Asnaashari .................... | 711/103 |
| 6,931,641 B1 * | 8/2005 | Davis et al. .................... | 718/108 |
| 7,512,902 B2 * | 3/2009 | Robertson et al. ............. | 715/848 |
| 8,127,074 B2 * | 2/2012 | Rostedt .......................... | 711/110 |
| 8,572,617 B2 * | 10/2013 | Shorb ............................. | 718/102 |
| 2002/0194390 A1 * | 12/2002 | Elving ............................ | 709/312 |
| 2003/0065646 A1 * | 4/2003 | Joseph et al. .................... | 707/1 |
| 2005/0120351 A1 * | 6/2005 | de Bonet ........................ | 718/107 |
| 2008/0162859 A1 * | 7/2008 | Christenson et al. .......... | 711/170 |
| 2010/0312985 A1 * | 12/2010 | Rostedt .......................... | 711/206 |
| 2012/0331470 A1 * | 12/2012 | Jones et al. .................... | 718/102 |

* cited by examiner

*Primary Examiner* — Christopher Shin
(74) *Attorney, Agent, or Firm* — Patterson & Sheridan, LLP

(57) ABSTRACT

One embodiment sets forth a technique for dynamically allocating memory during multi-threaded program execution for a coprocessor that does not support dynamic memory allocation, memory paging, or memory swapping. The coprocessor allocates an amount of memory to a program as a put buffer before execution of the program begins. If, during execution of the program by the coprocessor, a request presented by a thread to store data in the put buffer cannot be satisfied because the put buffer is full, the thread notifies a worker thread. The worker thread processes a notification generated by the thread by dynamically allocating a swap buffer within a memory that cannot be accessed by the coprocessor. The worker thread then pages the put buffer into the swap buffer during execution of the program to empty the put buffer, thereby enabling threads executing on the coprocessor to dynamically receive memory allocations during execution of the program.

20 Claims, 8 Drawing Sheets

VIRTUAL MEMORY STRUCTURE FOR COPROCESSORS HAVING MEMORY ALLOCATION LIMITATIONS

BACKGROUND OF THE INVENTION

1. Field of the Invention

The present invention generally relates to dynamic memory allocation and more specifically to a virtual memory structure for coprocessors having memory allocation limitations.

2. Description of the Related Art

Some conventional coprocessors have memory allocation limitations and are unable to dynamically allocate memory during execution of a program. These conventional coprocessors limit a program to a maximum amount of memory that is allocated to the program before execution of the program begins. For some programs, however, the maximum amount of memory that may be needed during execution is not known. If, during execution, the amount of memory allocated to the program is insufficient, then the execution of the program fails.

Accordingly, what is needed in the art is a technique for providing additional memory to a program during execution.

SUMMARY OF THE INVENTION

A system and method for dynamically allocating additional memory during execution of a processing task enable the processing task to consume additional memory that was not allocated before execution of the processing task begins.

Various embodiments of a method of the invention for allocating memory to a program during execution include allocating a first buffer within a first memory that is accessible to a plurality threads when executing on a coprocessor. During execution of a processing task on the coprocessor; a worker thread executing on a central processing unit is notified that the first buffer is full. A first portion of a swap buffer within a second memory that is not accessible to the plurality of threads is allocated during execution and the first buffer is swapped into the first portion of the swap buffer.

Memory is dynamically allocated during execution of a program when the program is executed by a coprocessor that does not support memory paging or swapping. The memory is dynamically executed by a worker thread executing on a different processor that does support memory paging or swapping.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
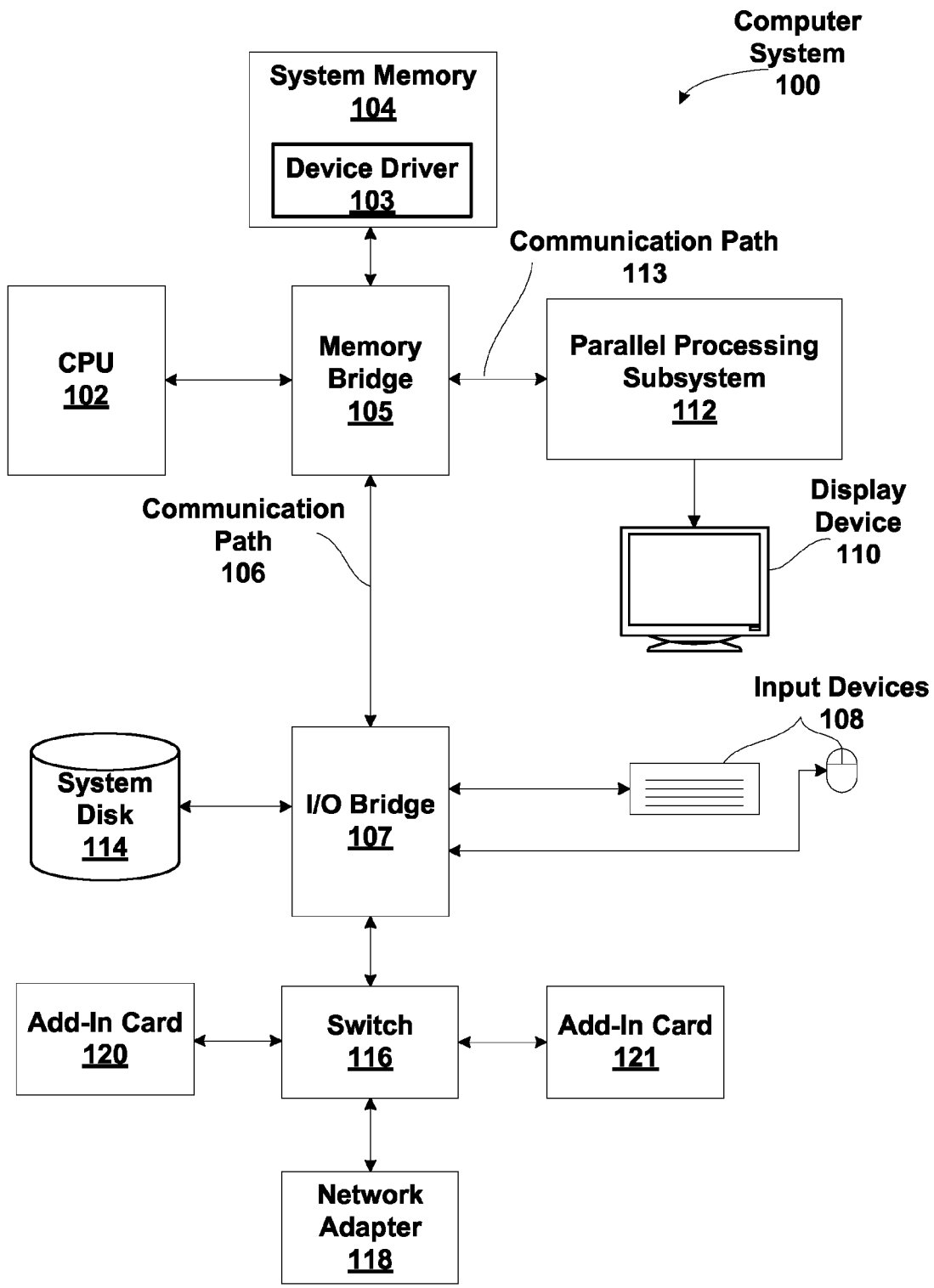
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
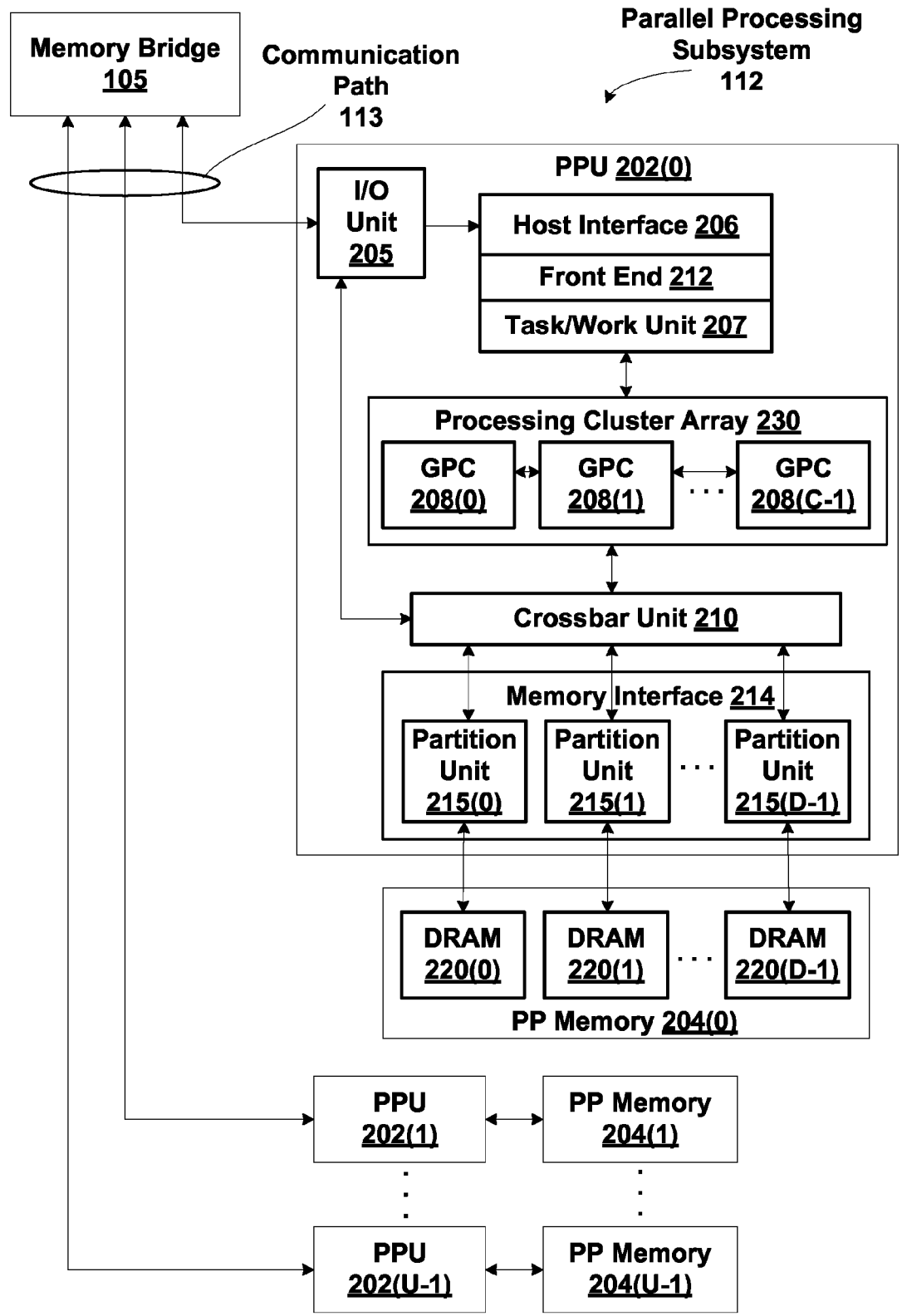
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Task Processing Overview

Each GPC 208 shown in FIG. 2 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

In one embodiment, each GPC 208 includes a number M of streaming multiprocessors that are each configured to process one or more thread groups. The series of instructions transmitted to a particular GPC 208 constitutes a thread, as previously defined herein, and the collection of a certain number of concurrently executing threads across the parallel processing engines within a streaming multiprocessor is referred to herein as a "warp" or "thread group." As used herein, a "thread group" refers to a group of threads concurrently executing the same program on different input data, with one thread of the group being assigned to a different processing engine within a streaming multiprocessor. A thread group may include fewer threads than the number of processing engines within the streaming multiprocessor, in which case some processing engines will be idle during cycles when that thread group is being processed. A thread group may also include more threads than the number of processing engines within the streaming multiprocessor, in which case processing will take place over consecutive clock cycles. Since each streaming multiprocessor can support up to G thread groups concurrently, it follows that up to G*M thread groups can be executing in GPC 208 at any given time.

Additionally, a plurality of related thread groups may be active (in different phases of execution) at the same time within a streaming multiprocessor. This collection of thread groups is referred to herein as a "cooperative thread array"

("CTA") or "thread array." The size of a particular CTA is equal to m*k, where k is the number of concurrently executing threads in a thread group and is typically an integer multiple of the number of parallel processing engines within the streaming multiprocessor, and m is the number of thread groups simultaneously active within the streaming multiprocessor. The size of a CTA is generally determined by the programmer and the amount of hardware resources, such as memory or registers, available to the CTA.

Each streaming multiprocessor contains a level one (L1) cache or uses space in a corresponding L1 cache outside of the streaming multiprocessor that is used to perform load and store operations. Each streaming multiprocessor also has access to level two (L2) caches that are shared among all GPCs 208 and may be used to transfer data between threads. Finally, streaming multiprocessor also have access to off-chip "global" memory, which can include, e.g., parallel processing memory 204 and/or system memory 104. It is to be understood that any memory external to PPU 202 may be used as global memory.

Each GPC 208 may include a memory management unit (MMU) that is configured to map virtual addresses into physical addresses. In other embodiments, the MMU(s) may reside within the memory interface 214. The MMU includes a set of page table entries (PTEs) used to map a virtual address to a physical address of a tile and optionally a cache line index. The MMU may include address translation lookaside buffers (TLB) or caches. The physical address is processed to distribute surface data access locality to allow efficient request interleaving among the partition units 215. The cache line index may be used to determine whether or not a request for a cache line is a hit or miss.

It will be appreciated that the core architecture described herein is illustrative and that variations and modifications are possible. For example, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3:
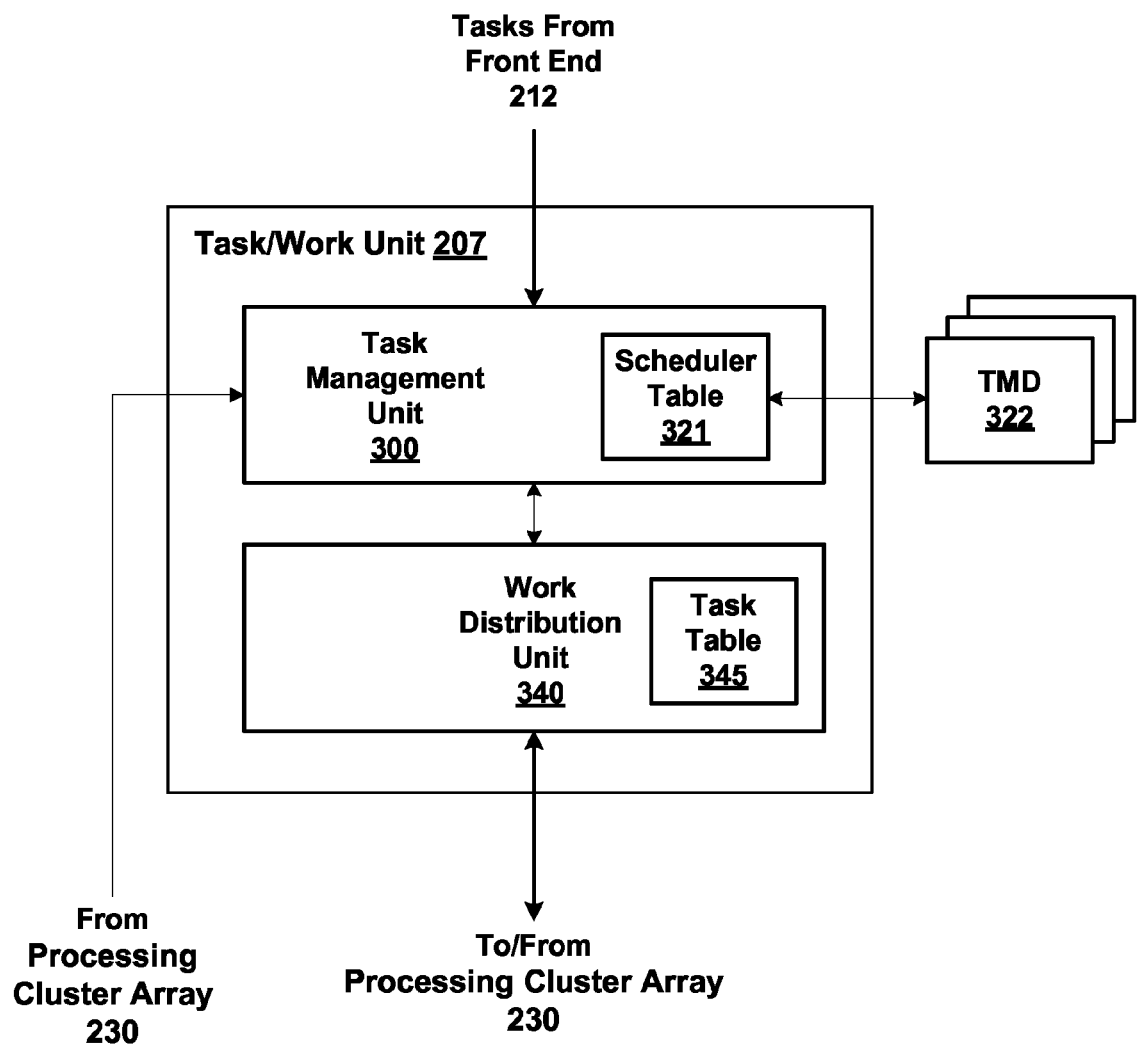
FIG. 3 is a block diagram of the Task/Work Unit of FIG. 2, according to one embodiment of the invention.

Persons of ordinary skill in the art will understand that the architecture described in FIGS. 1, 2, and 3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

FIG. 3 is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of task pointers to the TMDs 322 corresponding to the tasks in the scheduler table 321, where the list can be implemented with a linked list, and hereinafter a linked list is assumed. The TMDs 322 are metadata representing a task, such as configuration data and state information needed to execute the task. The TMDs 322 may be stored in the PP memory 204 or system memory 104 that is accessible to the parallel processing subsystem 112. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child processing task is added to a linked list in the scheduler table 321. A task is removed from a slot when the task is evicted.

A TMD 322 encapsulates the metadata for a processing task, including grid dimensions. The grid dimensions (n,m), where n and m are integers, specify the number of CTAs that are executed to process the task. For example, grid dimensions 1,1 specify a single CTA and grid dimensions 2,1 or 1,2 specify two CTAs. Grids may have more than two dimensions, and all dimension sizes are specified in the TMD. Each CTA requires some architectural resources for execution. The architectural resources may include a portion of per-task memory storage, per-CTA shared memory, per-thread local memory, registers, CTA identifiers, number of thread groups, number of threads, processing resources, or any other quantifiable architectural resource that may be consumed by a task.

The work distribution unit 340 tracks the available resources needed for processing a task and, in some cases, the maximum amount of resources that may be consumed is limited. Because the PPUs 202 are not configured to support dynamic memory allocation, memory paging, or memory swapping, the memory needed for storing per-task data for a particular application program needs to be allocated (or reserved) before the application program is executed by the PPUs 202. Because a given processing task may generate a number of child tasks, and the number of child tasks is unknown, determining the maximum amount of memory that will be consumed during execution of a task is not possible. One solution to this challenge is to limit the amount of memory that can be consumed by each CTA. The work distribution unit 340 may be configured to ensure that the per-CTA limited amount of memory is available as a prerequisite to launching each the CTA, otherwise the state of the CTA may not be able to be saved and subsequently restored. Another solution is to provide a mechanism by which memory can be dynamically allocated during execution of the tasks so that the amount of memory a CTA may consume is not limited.

Virtual Memory Structure

As previously explained, certain coprocessor devices, such as the PPUs 202, do not have the ability to allocate memory while threads on the PPUs 202 are executing code for an application program. Consequently, all memory to be used by the threads executing on the PPUs 202 must be allocated by the host processor, CPU 102 before execution begins on any of the PPUs 202. The PPUs 202 also are not able to page in or page out pieces of memory on demand, which constrains an application program executing on the PPUs 202 to use no more than the physical memory associated with the PPUs 202 while threads are running.

While such limitations may have been acceptable for many application programs targeted at conventional graphics processors, a more flexible solution is desired. In particular, the nested parallelism capabilities of the PPUs 202 that adds the ability to launch new child tasks from threads already running on the PPUs 202. While the amount of memory for a single launch of a new task or a child task may not be large, nested parallelism allows threads to launch any unbounded number of new child tasks. Therefore, the amount of memory needed for even a single task cannot be predicted. A virtual memory structure may be used to perform dynamic memory allocation after a task has been launched.

The virtual memory structure may be implemented to model a first-in first-out queue structure or a memory pool. The virtual memory structure is configured to grow indefinitely, even when running on a coprocessor (e.g., PPU 202) that is capable of neither dynamically allocating memory nor allocating swappable (pageable) memory. The ability to increase the amount of memory in the virtual memory structure allows a queue or memory pool available to the PPUs 202 to be used to store an unbounded number of elements, despite requiring only small memory allocations prior to beginning execution of any tasks for an application program. Dynamic allocation of memory as new tasks are launched is critical when the number of child tasks that will be created during the execution of an application program is unknown. In many cases, the maximum size of the memory needed during execution of the application program may be unknowable or significantly larger than the memory that is allocated to the PPUs 202.

A virtual memory structure that models a queue may have any standard queue interface, e.g., push_tail( ) and pop_head( ) but, unlike an queue implemented in circuitry is not restricted to any fixed maximum number of elements in the queue. Similarly, a virtual memory structure that models a pool may have any standard access interface, e.g., put_entry( ) and get_entry( ) and is also not restricted to any fixed maximum number of elements in the pool. The virtual memory structure requires only some small amount of memory that is pre-allocated to the PPU(s) 202 prior to threads beginning execution on the PPU(s) 202. When the pre-allocated memory runs out, a runtime handling the virtual memory structure implementation migrates some of the data stored in the pre-allocated memory to memory that is not accessible to the PPU(s) 202 that is dynamically allocated by the CPU 102 and accessible to the CPU 102, but not accessible to the PPU(s) 202. In one embodiment, the PPU(s) 202 are configured to produce data that will be consumed by the PPU(s) 202 later. When the data that is produced exceeds the capacity of the pre-allocated memory, the data is migrated to additional memory. The host processor, CPU 102 which supports dynamic memory allocation and paging, provides the additional memory beyond that which was pre-allocated for the application program and that is accessible by the PPU(s) 202. When a thread executing on a PPU 202 requests to remove (pop or get) an element from the virtual queue structure, the runtime will migrate the data from the memory that is not accessible to the PPU(s) 202 to the pre-allocated memory, if necessary, and then return the data to the thread.

The underlying runtime and data migration performed by the virtual memory structure is invisible to the threads executing on the PPU(s) 202. To threads executing on the PPU(s) 202, the virtual memory structure simply appears to be a queue or pool that is not restricted by the normal memory limitations of the PPU(s) 202. In other words, the virtual memory structure may keep growing to be larger than the memory pre-allocated to the PPU(s) 202 or even the physical memory (PP memory 204) associated with the PPU 202.

Figure 4A:
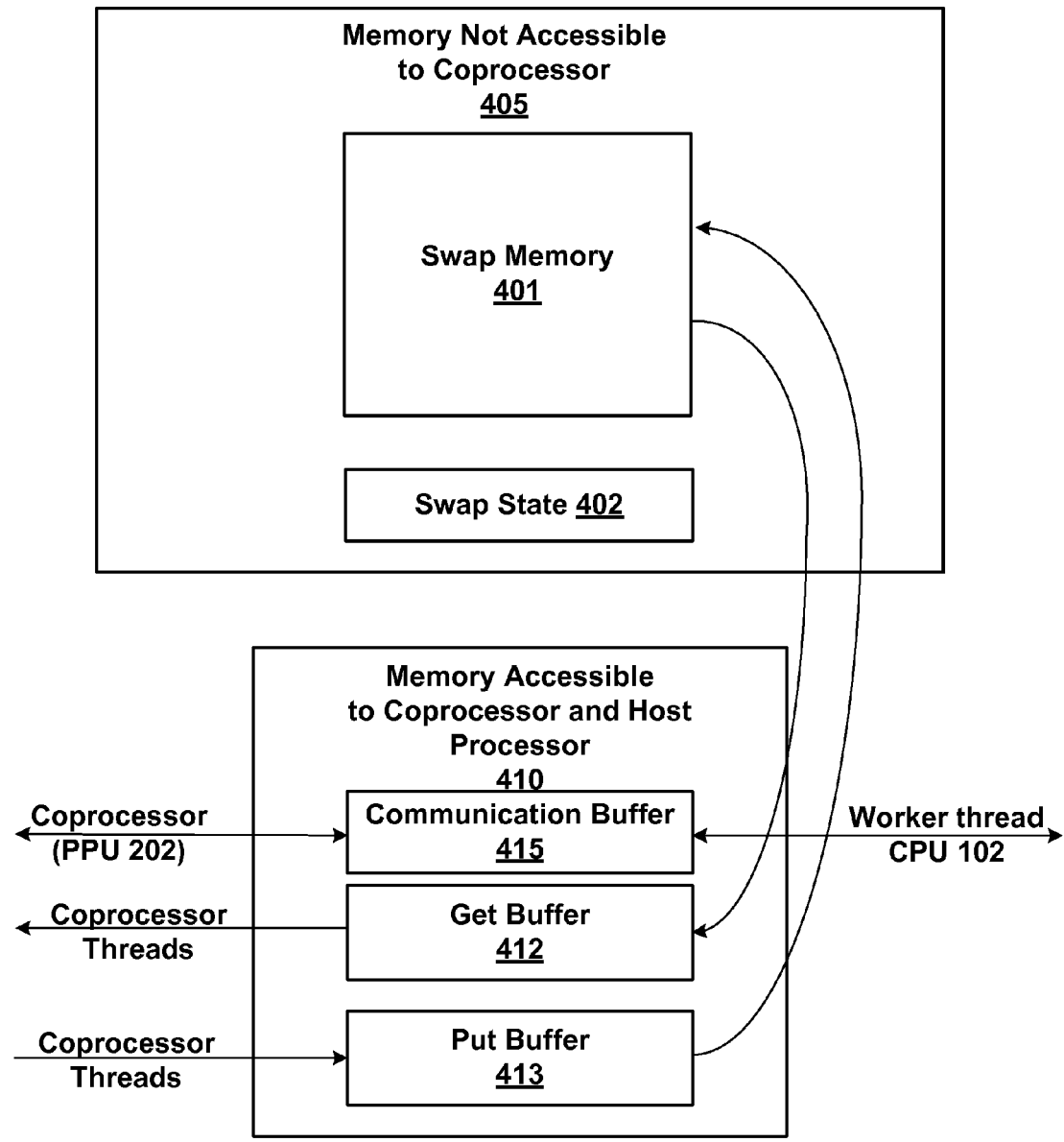
FIG. 4A is a conceptual diagram that illustrates memory that is not accessible to a coprocessor and memory that is accessible to the coprocessor, according to one embodiment of the invention.

FIG. 4A is a conceptual diagram that illustrates a virtual memory structure 400 including memory that is not accessible to a coprocessor and memory that is accessible to the coprocessor, according to one embodiment of the invention. The virtual memory structure 400 includes the memory not accessible to coprocessor 405 and the memory accessible to coprocessor 410. The host processor, CPU 102 is able to allocate memory that is accessible to both the CPU 102 and the coprocessor, where the coprocessor is one or more PPUs 202. Memory that is accessible to both the CPU 102 and the coprocessor, such as the memory accessible to coprocessor 410 may be pinned system memory, i.e., a portion of the system memory 104. The system memory 104 may be directly coupled to the CPU 102 or coupled to the CPU 102 through the memory bridge 105. The system memory 104 is indirectly coupled to the parallel processing subsystem 112 through the communication path 113.

As used herein, the term accessible indicates that a portion of memory has been allocated or reserved for use by a particular program executing on either the CPU 102 or the PPUs 202. While connections between the system memory 104 and the PP memory 204 may provide a mechanism to pass signals (read and write requests) between the CPU 102 and the system memory 104 and/or the PP memory 204, the system memory 104 and the PP memory 204 are only considered to be accessible to the CPU 102 when portions of the system memory 104 and/or the PP memory 204 are allocated to a particular program executing on the CPU 102. Similarly, although connections between the system memory 104 and the PP memory 204 may provide a mechanism to pass signals between the PPUs 202 and the system memory 104 and/or the PP memory 204, the system memory 104 and the PP memory 204 are only considered to be accessible to the PPUs 202 when portions of the system memory 104 and/or the PP memory 204 are allocated to a particular program executing on the PPUs 202. Typically, application programs executing on the PPUs 202 are allocated portions of the PP memory 204 and application program executing on the CPU 102 are allocated portions of the system memory 104 to minimize memory access latency. However, application programs executing on the PPUs 202 may be allocated portions of the system memory 104 and application program executing on the CPU 102 may be allocated portions of the PP memory 204.

The CPU 102 supports memory paging or swapping and is able to dynamically allocate memory and is able to allocate pageable or swappable memory in either the system memory 104 or the PP memory 204. The coprocessor (PPUs 202) is not able to dynamically allocate memory and/or does not support memory paging or swapping and is not able to allocate pageable or swappable memory. Therefore, prior to starting an application program, the device driver 103 allocates the memory accessible to coprocessor and host processor 410 for use by the PPUs 202 during executing of the application program. The amount of memory accessible to coprocessor and host processor 410 is set at allocation time. Therefore, the amount of memory available in allocation get buffer 412, a put buffer 413, and a communication buffer 415 is set at allocation time. The get buffer 412, put buffer 413, and the communication buffer 415 may be read or written by both the coprocessor and the CPU 102.

During execution of the application program by the PPUs 202, threads generate tasks represented as data that are stored in memory accessible to coprocessor and the host processor 410. The generated tasks will be consumed or processed in the future and the memory consumed to store generated tasks is placed into the put buffer 413. The put buffer 413 may be configured to store pointers to portions of physical memory. The get buffer 412 may be configured to store pointers to portions of physical memory that store data representing a (generated) processing task to be processed by a thread. When a thread requests a processing task, the thread removes ("pops" or "gets") a processing task that is stored in a portion of memory accessible to coprocessor and host processor 410 from the get buffer 412.

When the virtual memory structure 400 models a queue, the order in which the threads push memory allocations into the put buffer 413 is maintained and at a later point in time, the memory allocations are popped from the get buffer 412 in the first-in first-out order. When the virtual memory structure 400 models a pool, the memory allocations consumed by data (generated processing tasks) that was inserted into the put buffer 413 by a thread executing on the PPU(s) 202 may be retrieved by the same thread or a different thread executing on the PPU(s) 202 from the get buffer 412 in a different order.

Because a limited amount of memory is allocated for the get buffer 412 and the put buffer 413, the get buffer 412 may become empty and the put buffer 413 may become full. A worker thread that executes on the CPU 102 monitors the status of the get buffer 412 and the put buffer 413 through the communication buffer 415. The worker thread is guaranteed to be scheduled at least occasionally to poll the communication buffer 415. The worker thread is configured to dynamically allocate swap memory 401, as needed, to provide additional memory for allocation to the threads executing on the coprocessor. The worker thread maintains state information specific to the swap memory 401, e.g., physical locations of swap memory, in a swap state 402. The amount of memory in the swap memory 401 starts at zero, increases as needed to refill the get buffer 412, and decreases as memory allocations are released (when threads exit upon completion of a processing task). The swap memory 401 may only be read or written by the CPU 102.

A thread executing on the coprocessor may use pop_head( ) and push_tail( ) methods to retrieve a processing task from the get buffer 412 and request a memory allocation for storing a processing task to the put buffer 413. When the virtual memory structure 400 models a queue, the get buffer 412 is the head of the queue, the swap memory 401 (if any) is the middle of the queue, and the put buffer 413 is the tail of the queue. The size of the queue can grow as the worker thread dynamically increases the size of the swap memory 401.

Figure 4B:
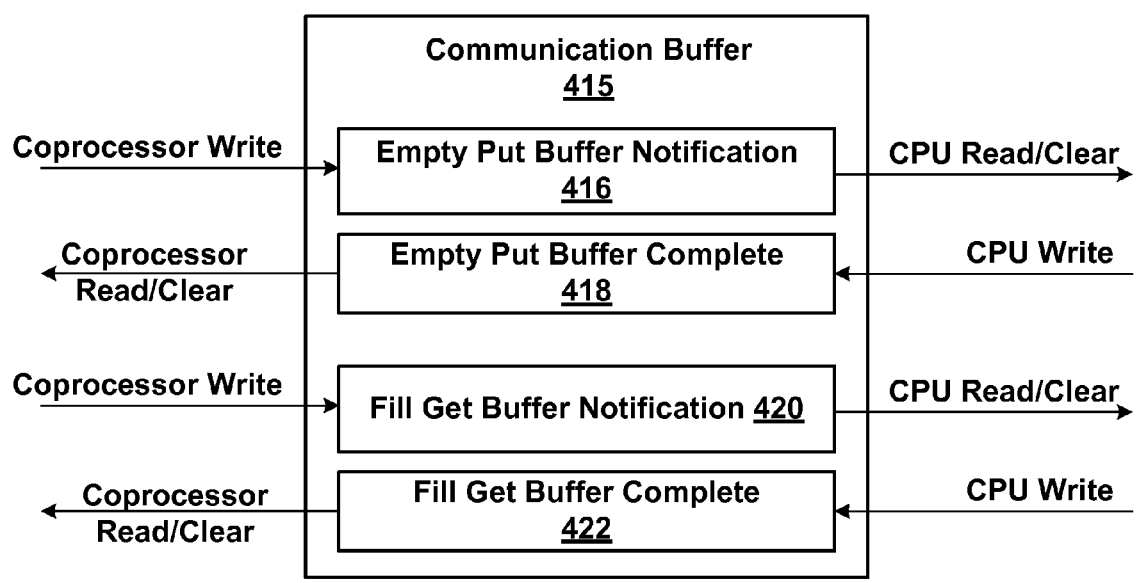
FIG. 4B illustrates the communication buffer of FIG. 4A, according to one embodiment of the invention.

FIG. 4B illustrates the communication buffer 415 of FIG. 4A, according to one embodiment of the invention. When a coprocessor thread requests a memory allocation and to insert the memory allocation (generated processing task or other data) into the put buffer 413 and the put buffer 413 is full, the thread notifies the worker thread by writing an empty put buffer notification 416 in the communication buffer 415. The worker thread executing on the CPU 102 reads the empty put buffer notification 416 continuously, periodically, or upon other asynchronous notification (e.g., an interrupt received from the CPU 102). When the worker thread determines that a coprocessor thread has posted a notification by writing (or setting) the empty put buffer notification 416, the worker thread clears the empty put buffer notification 416.

If the swap memory 401 does not have enough capacity to store the put buffer 413, then the worker thread may dynamically allocate additional memory as swap memory 401. The additional memory needed in the swap memory 401 is allocated from memory that is not accessible to the coprocessor. The worker thread updates the swap state 402 to track the newly allocated additional memory in the swap memory 401. The allocations in the swap memory 401 may be tracked using a linked list. The worker thread then copies the contents of the put buffer 413 to the swap memory 401 consuming a portion of the capacity of the swap memory 401. The contents of the put buffer 413 that were accessible to the coprocessor are no longer accessible to the coprocessor after the worker thread moves the contents of the put buffer 413 to the swap memory 401 because the swap memory 401 is stored in the memory not accessible to the coprocessor. When the contents are needed by the coprocessor, the contents may be moved from the swap memory 401 into the get buffer 412, as described further herein.

Once the worker thread has emptied the put buffer 413, the worker thread writes the empty put buffer complete 418 in the communication buffer 415 to notify the coprocessor thread that the put buffer 413 has been emptied. The coprocessor thread then reads and clears the empty put buffer complete

418. The empty put buffer complete 418 may be a single bit in the communication buffer 415 that can be written by the worker thread executing on the CPU 102 and read and cleared by coprocessor threads.

When a coprocessor thread attempts to retrieve data previously stored in the virtual memory structure 400, e.g., a processing task that is now ready to begin execution from the get buffer 412 and the get buffer 412 is empty, the thread notifies the worker thread by writing an fill get buffer notification 420 in the communication buffer 415. The worker thread executing on the CPU 102 reads the fill get buffer notification 420 continuously, periodically, or upon other asynchronous notification (e.g., an interrupt received from the CPU 102). When the worker thread determines that a coprocessor thread has posted a notification by writing (or setting) the fill get buffer notification 420, the worker thread clears the fill get buffer notification 420. The fill get buffer notification 420 may be a single bit in the communication buffer 415 that can be written by coprocessor threads and read and cleared by the worker thread executing on the CPU 102.

If the swap memory 401 is empty, the worker thread then determines if the put buffer 413 is not empty, and, if so, then the worker thread moves one or more generated tasks from the put buffer 413 to the get buffer 412. The worker thread checks that the swap memory 401 is empty, i.e., no generated tasks are stored in the swap memory 401, before checking the put buffer 413 so that the FIFO order is maintained for data stored in the virtual memory structure 400 when the virtual memory structure 400 models a queue. If the swap memory 401 is not empty, according to the swap state 402, then the worker thread copies generated tasks stored in the swap memory 401 to the get buffer 412. The swap state 402 is updated to indicate that the portion of the swap memory 401 that filled the get buffer 412 is available for allocation. In one embodiment, the portion of the swap memory 401 may be deallocated from the memory not accessible to coprocessor 405 or freed from the swap memory 401.

Once the worker thread has refilled the get buffer 412, the worker thread writes the fill get buffer complete 422 in the communication buffer 415 to notify the coprocessor thread that the get buffer 415 has been filled. The coprocessor thread then reads and clears the fill get buffer complete 422. The fill get buffer complete 422 may be a single bit in the communication buffer 415 that can be written by the worker thread executing on the CPU 102 and read and cleared by coprocessor threads.

The threads executing on the coprocessor communicate with the worker thread through the communication buffer 415 using a handshake-type of protocol. Other handshake-type mechanisms may be used that also ensure the communication is coherent between the CPU 102 and the PPUs 202. Additionally, because multiple coprocessor threads may attempt to simultaneously receive data from the get buffer 412 and/or simultaneously insert data (e.g., a generated task structure) to the put buffer 413, the data should be inserted and returned using atomic operations to guarantee a consistent virtual memory structure 400. Furthermore, a lock should be acquired to ensure that only a single coprocessor thread accesses the communication buffer 415 to notify the worker thread to refill the get buffer 412 or empty the put buffer 413. The lock should not be released until the worker thread has acknowledged the completion of the refill or empty operation by writing the communication buffer 415 to complete the handshake. While the lock technique is used to enforce single-producer single-consumer accesses for the virtual memory structure 400, other, more complicated multiple-producer multiple consumer protocols may be implemented.

Figure 4C:
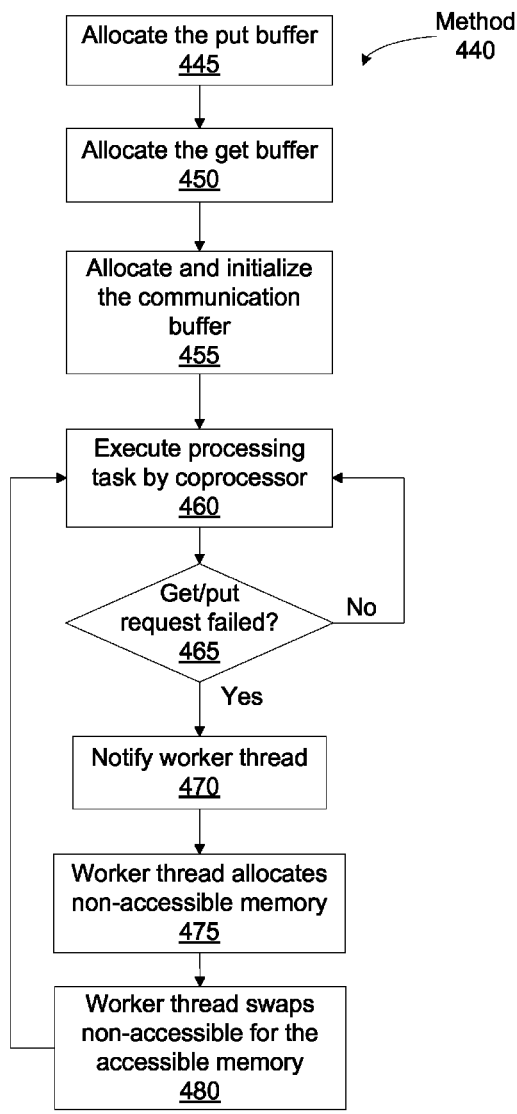
FIG. 4C illustrates a method for dynamically allocating additional memory during execution of a program by the coprocessor, according to one embodiment of the invention.

FIG. 4C illustrates a method 440 for dynamically allocating additional memory during execution of a program by a coprocessor, according to one embodiment of the invention. Although the method steps are described in conjunction with the systems of FIGS. 1, 2, 3, 4A, and 4B, persons skilled in the art will understand that any system configured to perform the method steps, in any order, is within the scope of the inventions.

At step 445, the device driver 103 (e.g., a CUDA device driver) allocates a first buffer, the put buffer 413 within a first memory that is accessible to a plurality threads when executing on a coprocessor such as one or more PPUs 202. The first memory is memory accessible to coprocessor and host processor 410 as shown in FIG. 4A. At step 450, the device driver 103 allocates a second buffer, the get buffer 412 within the first memory. At step 455, the device driver 103 allocates and initializes a third buffer, the communication buffer 415 within the first memory. The communication buffer 415 is initialized to clear the notifications associated with the first and second buffers and clear the indications that the worker thread has completed processing of the notifications.

At step 460 a processing task is executed by the coprocessor. At step 465, a coprocessor thread determines if a memory request fails, i.e., if the put buffer 413 is full or if the get buffer 412 is empty. If, at step 465, the memory request does not fail, then the coprocessor thread inserts a generated task into the put buffer 413 or receives a generated task from the get buffer 412 and at step 460 execution of the processing task continues. If, at step 465, the memory request fails, then at step 470 the coprocessor thread notifies a worker thread executing on the CPU 102 that the first buffer is full or that the second buffer is empty.

At step 475, the worker thread dynamically allocates a first portion of the swap buffer 401 within a second memory that is not accessible to the plurality of threads during execution to store the put buffer 413 when the put buffer 413 is full. The second memory is the memory not accessible to coprocessor 405. If the swap buffer 401 is empty, the worker thread first dynamically allocates memory that is not accessible to the coprocessor to the swap buffer 401. When the get buffer 412 is empty, the worker thread allocates a first portion of the swap buffer 401 that stores generated tasks to swap into the get buffer 412. At step 480, the worker thread swaps the first portion of the swap buffer 401 into the get buffer 412 when the get buffer 412 is empty and swaps the put buffer 413 into the first portion of the swap buffer 401 when the put buffer 413 is full, thereby making the first portion of the swap buffer 405 accessible to the coprocessor during execution of the processing task.

Figure 5A:
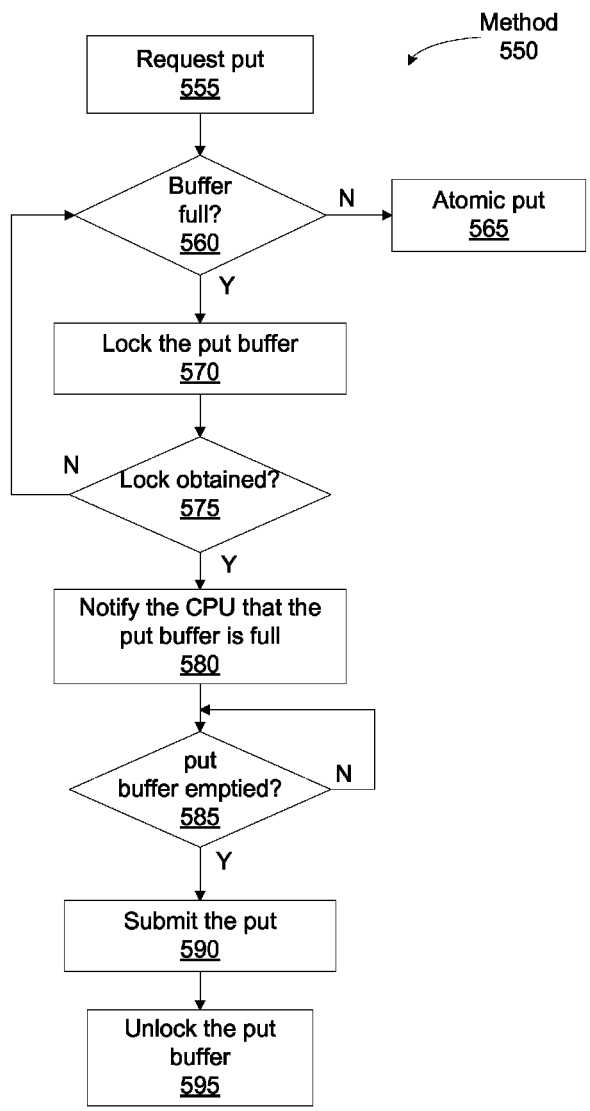
FIG. 5A illustrates a method for emptying the put buffer of FIG. 4A, according to one embodiment of the invention.

FIG. 5A illustrates a method for emptying the put buffer 413, according to one embodiment of the invention. Although the method steps are described in conjunction with the systems of FIGS. 1, 2, 3, 4A, and 4B, persons skilled in the art will understand that any system configured to perform the method steps, in any order, is within the scope of the inventions. At step 555 a coprocessor thread requests an allocation from the put buffer 413 for storing data, e.g., a task structure. At step 510 the coprocessor thread determines if the put buffer 413 is full, and, if not, at step 565 the coprocessor thread performs an atomic operation to return a memory allocation to the put buffer 413. Using an atomic operation ensures that each allocation is returned to one and only one slot in the put buffer 413 when multiple coprocessor threads attempt to simultaneously insert data into the put buffer 413.

If, at step 560 the coprocessor thread determines that the put buffer 413 is full, then at step 570 the coprocessor thread attempts to lock access to the put buffer 413 so that the put buffer 413 cannot be accessed by any other coprocessor threads during the buffer emptying process. At step 575, the coprocessor thread determines if the lock was obtained, and, if not, then the coprocessor thread returns to step 560. Otherwise, the coprocessor thread obtains the lock, and at step 580 the coprocessor thread notifies the work thread executing on the CPU 102 that the put buffer 413 is full. At step 585, the coprocessor thread determines if the put buffer 413 has been emptied by the work thread by reading the empty put buffer complete 418. Step 585 is repeated until the coprocessor thread determines that the put buffer 413 has been emptied. Then, at step 590 the coprocessor thread returns the allocation to the put buffer 413. At step 590, the coprocessor thread unlocks the put buffer 413, allowing other coprocessor threads to access the put buffer 413, including any coprocessor threads that were not able to obtain the lock at step 570.

Figure 5B:
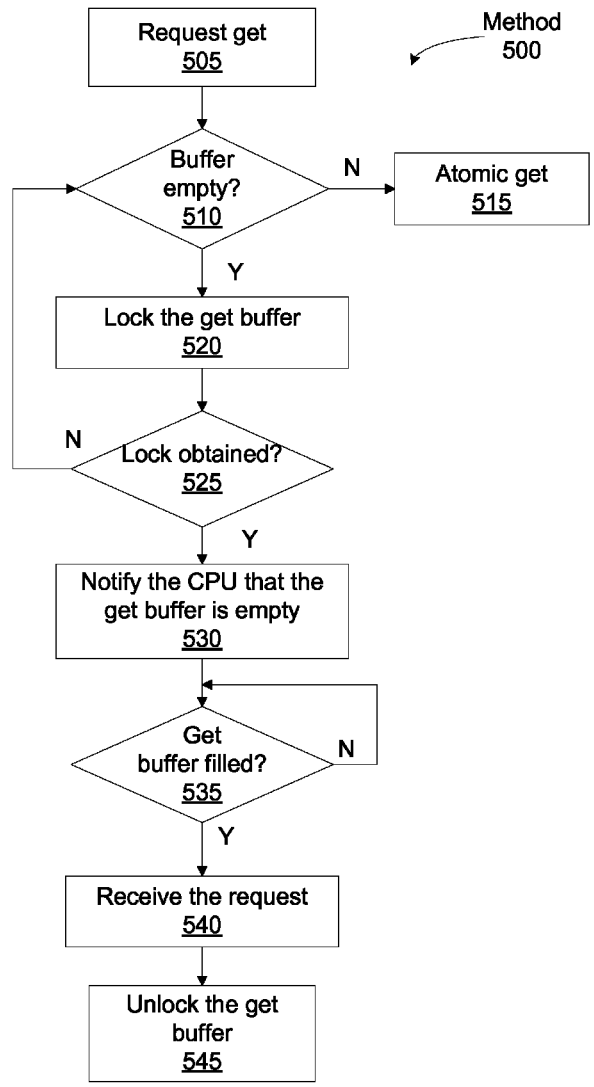
FIG. 5B illustrates a method for filling the get buffer of FIG. 4A, according to one embodiment of the invention

FIG. 5B illustrates a method 500 for filling the get buffer 412, according to one embodiment of the invention. Although the method steps are described in conjunction with the systems of FIGS. 1, 2, 3, 4A, and 4B, persons skilled in the art will understand that any system configured to perform the method steps, in any order, is within the scope of the inventions. At step 505 a coprocessor thread requests data from the get buffer 412. At step 510 the coprocessor thread determines if the get buffer 412 is empty, and, if not, at step 515 the coprocessor thread performs an atomic operation to retrieve data from the get buffer 412. Using an atomic operation ensures that each of the data retrieved is provided to one and only one coprocessor thread when multiple coprocessor threads attempt to simultaneously receive data from the get buffer 412.

If, at step 510 the coprocessor thread determines that the get buffer 412 is empty, then at step 520 the coprocessor thread attempts to lock access to the get buffer 412 so that the get buffer 412 cannot be accessed by any other coprocessor threads during the buffer refilling process. At step 525, the coprocessor thread determines if the lock was obtained, and, if not, then the coprocessor thread returns to step 510. Otherwise, the coprocessor thread obtains the lock, and at step 530 the coprocessor thread notifies the work thread executing on the CPU 102 that the get buffer 412 is empty. At step 535, the coprocessor thread determines if the get buffer 412 has been filled by the work thread by reading the fill get buffer complete 422. Step 535 is repeated until the coprocessor thread determines that the get buffer 412 has been filled. Then, at step 540 the coprocessor thread receives data from the get buffer 412. At step 545, the coprocessor thread unlocks the get buffer 412, allowing other coprocessor threads to access the get buffer 412, including any coprocessor threads that were not able to obtain the lock at step 520.

In sum, a coprocessor allocates an amount of memory to a program as a put buffer before execution of the program begins. If, during execution of the program by the coprocessor, a request presented by a thread to store data in the put buffer cannot be satisfied because the put buffer is full, the thread notifies a worker thread. The worker thread processes a notification generated by the thread by dynamically allocating a swap buffer within a memory that cannot be accessed by the coprocessor. The worker thread then pages the put buffer into the swap buffer during execution of the program to empty the put buffer. The worker thread enables threads to dynamically receive memory allocations during execution of a program by the coprocessor. The amount of memory available during execution of the program is not limited by the amount of memory allocated for the put buffer.

The ability to dynamically allocate memory during execution of a processing task enables a processing task to produce an unlimited number of child tasks that may also produce child tasks. In other words, the number of nesting levels for nested parallel tasks is not limited. Likewise, the number of child processing tasks that may be generated and the amount of memory that each task and child task may consume is not constrained based on a fixed allocation of memory. The virtual memory structure enables dynamic allocation of memory during execution of an application program even when the coprocessor executing the application program does not support memory paging or swapping.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method of allocating memory to a program during execution, the method comprising:
   allocating a first buffer within a first memory that is accessible to a plurality threads when executing on a coprocessor;
   during execution of a processing task on the coprocessor; notifying a worker thread executing on a central processing unit that the first buffer is full;
   allocating a first portion of a swap buffer within a second memory that is not accessible to the plurality of threads during execution; and
   swapping the first buffer into the first portion of the swap buffer.

2. The method of claim 1, further comprising allocating a third buffer within the first memory that is accessible to the plurality threads to produce a get buffer that stores data generated by the plurality of threads during execution of the processing task.

3. The method of claim 2, further comprising:
   during execution of the processing task on the coprocessor; notifying the worker thread the third buffer is empty;
   determining that the swap buffer is empty; and
   swapping at least a portion of the first memory corresponding to the first buffer into the third buffer.

4. The method of claim 2, further comprising:
   determining that the third buffer is empty; and
   notifying the worker thread that the third buffer is empty; and
   swapping the first portion of the swap buffer into a portion of the first memory corresponding to the third buffer.

5. The method of claim 1, further comprising, prior to swapping the first buffer into the swap buffer:
   determining that the swap buffer is empty; and allocating an additional portion of the second memory to the swap buffer.

6. The method of claim 4, further comprising, prior to notifying the worker thread that the third buffer is empty, locking access to the third buffer.

7. The method of claim 1, further comprising:
allocating a second buffer within the first memory that is accessible to the plurality threads to produce a communication buffer; and
initializing the communication buffer.

8. The method of claim 1, further comprising, after swapping, notifying the plurality of threads that the first buffer is not full.

9. The method of claim 1, wherein notifying the worker thread comprises:
writing, by a thread of the plurality of threads, the communication buffer;
and reading, by the worker thread, the communication buffer.

10. The method of claim 1, wherein the first buffer is a put buffer configured to provide memory allocations to the plurality of threads during execution of the processing task for storing at least one additional processing task generated during execution of the processing task.

11. The method of claim 1, wherein the first buffer and the swap buffer are configured to model a first-in first-out queue.

12. The method of claim 1, wherein the first buffer and the swap buffer are configured to model a memory allocation pool.

13. The method of claim 1, further comprising, prior to notifying the worker thread, locking access to the first buffer.

14. A non-transitory computer-readable storage medium storing instructions that, when executed by at least one processor, cause memory to be allocated to a program during execution, by:
allocating a first buffer within a first memory that is accessible to a plurality threads when executing on a coprocessor;
during execution of a processing task on the coprocessor; notifying a worker thread executing on a central processing unit that the first buffer is full;
allocating a first portion of a swap buffer within a second memory that is not accessible to the plurality of threads during execution; and
swapping the first buffer into the first portion of the swap buffer.

15. The non-transitory computer-readable storage medium of claim 14, further comprising allocating a third buffer within the first memory that is accessible to the plurality threads to produce a get buffer that stores data generated by the plurality of threads during execution of the processing task.

16. The non-transitory computer-readable storage medium of claim 14, further comprising:
allocating a second portion of the first memory to produce a communication buffer; and
initializing the communication buffer.

17. The non-transitory computer-readable storage medium of claim 14, further comprising, after swapping, notifying the plurality of threads that the first buffer is not full.

18. A computing system, comprising:
a first processing unit configured to:
allocate a first buffer within a first memory that is accessible to a plurality threads when executing on a coprocessor, and
during execution of a processing task, notify a worker thread executing on a central processing unit that the first buffer is full; and
a second processing unit configured to:
allocate a first portion of a swap buffer within a second memory that is not accessible to the plurality of threads during execution, and
swap the first buffer into the first portion of the swap buffer.

19. The computing system of claim 18, wherein the first processing unit is further configured to allocate a third buffer within the first memory that is accessible to the plurality threads to produce a get buffer that stores data generated by the plurality of threads during execution of the processing task.

20. The computing system of claim 18, wherein the first processing unit is further configured to:
allocate a second portion of the first memory to produce a communication buffer; and
initialize the communication buffer.

* * * * *